United States Patent [19]
Oshima

[11] Patent Number: 5,370,493
[45] Date of Patent: Dec. 6, 1994

[54] LIFTING APPARATUS FOR VEHICLE

[76] Inventor: Shinnosuke Oshima, 4-5-13 Nishikawaguchi, Kawaguchi-shi Saitama-ken, Japan

[21] Appl. No.: 100,856

[22] Filed: Aug. 2, 1993

[51] Int. Cl.⁵ ............................................. B60P 1/44
[52] U.S. Cl. ................................... 414/556; 414/917; 414/921
[58] Field of Search ............... 414/546, 556, 557, 917, 414/921

[56] References Cited

U.S. PATENT DOCUMENTS

| | | | |
|---|---|---|---|
| 1,113,191 | 10/1914 | Breese, Jr. | 414/557 |
| 2,843,277 | 7/1958 | Brannan | 414/556 |
| 3,637,097 | 1/1972 | Horowitz | 414/557 |
| 3,830,384 | 8/1974 | Barber | 414/556 |
| 4,095,704 | 6/1978 | Ratliff | 414/556 |
| 4,134,504 | 1/1979 | Salas et al. | 414/921 X |
| 4,273,217 | 6/1981 | Kajita | 414/921 X |

FOREIGN PATENT DOCUMENTS

| | | | |
|---|---|---|---|
| 22643 | 1/1989 | Japan | 414/546 |
| 766918 | 9/1980 | U.S.S.R. | 414/557 |

Primary Examiner—David A. Bucci
Attorney, Agent, or Firm—Edwin E. Greigg; Ronald E. Greigg

[57] ABSTRACT

A lifting apparatus for a vehicle, which comprises: a platform adapted to be fitted into a cut portion formed at the backward portion of the floor of a vehicle; a drive element provided at support members attached to the lower part of the floor; a drive shaft axially supported by the support members so that it rotates by expanding or contracting movement of a working rod of the drive element; an L-shaped drive arm having an elbow portion fixed to the drive shaft, a short rod portion, and a long rod portion pivotally supported by the platform; an L-shaped driven arm provided oppositely to the drive arm and having a long rod portion similarly pivotally supported by the platform, an elbow portion pivotally supported by the support member, and a short rod portion; and a connecting rod having both end portions respectively pivotally supported by the short rod portions of the driven arm and the drive arm, and adapted for transmitting a drive force of the drive element.

8 Claims, 5 Drawing Sheets

LIFTING APPARATUS FOR VEHICLE

BACKGROUND OF THE INVENTION

1. Field of the Invention

This invention relates to a lifting apparatus for a vehicle, and more particularly to a lifting apparatus for a vehicle utilized in the case of taking, e.g., a person utilizing a wheelchair into a vehicle such as a vehicle of the wagon type or a microbus, etc. from the back entrance/exit thereof, or in the case of taking a load or cargo of a proper amount of weight into a vehicle.

2. Prior Art

Hitherto, a lifting apparatus for a vehicle as disclosed in the Japanese Patent Application Laid Open No. 263144/1988 is known as an example of a lifting apparatus for a vehicle of this kind.

The lifting apparatus disclosed is proposed by the same applicant as this application. This lifting apparatus for a vehicle is an apparatus of the so-called drawer type. Its fundamental configuration is as follows. A containing box (container) for a platform is provided below the floor of a vehicle. This platform is advanced and withdrawn relative to the containing box through a plurality of opening/closing support arms opened and closed by a drive force of a hydraulically driven device and projected above the floor of the vehicle.

In the lifting apparatus for vehicle constituted as above, since the platform is accommodated into the portion below the floor, the entrance/exit portion at the back of the vehicle is in an open state. However, since a plurality of opening/closing arms are projected above the floor, there are various problems in manufacture. Particularly, when the opening/closing support arms and/or the hydraulically driven device, etc. are disposed on the side of the internal wall surface of the vehicle, the space for a human being or a load (cargo) is restricted. Further, since the platform is of the drawer type, it is necessary to advance or withdraw it by a certain distance in a backward direction with respect to a human being or a load (cargo) to be taken in. In addition, since this apparatus is of such a structure to accommodate the platform within a containing box, it is impossible to form the platform so that it has desired dimensions. For this reason, members such as a runner or a slide plate, etc. must be separately combined with the main plate to constitute a platform. Namely, with the above-described conventional lifting apparatus for vehicle, there were many problems including problems as mentioned above.

SUMMARY OF THE INVENTION

In view of drawbacks with the prior arts as described above, an object of this invention is to provide a lifting apparatus for a vehicle in which space within a vehicle is not restricted with respect to a human being or a load (cargo), there is no necessity of advancing or withdrawing the platform in a backward direction with respect to a human being or a load (cargo) to be taken in, i.e., it is unnecessary to provide a required space at the backward of a vehicle in taking the human being or load (cargo), etc. into the vehicle, and the platform is permitted to be be of a simple structure.

In accordance with this invention, there is provided a lifting apparatus for a vehicle, which comprises a platform adapted to be fitted into a cut portion formed at the backward portion of the floor of vehicle; drive means provided at support members attached to the lower part of the floor; a drive shaft axially supported by the support members so that it rotates by expanding or contracting movement of a working (operating) rod of the drive means; an L-shaped drive arm having an elbow portion fixed to the drive shaft, a short rod portion, and a long rod portion pivotally supported by the platform; an L-shaped driven arm provided oppositely to the drive arm and having a long rod portion similarly pivotally supported by the platform, an elbow portion pivotally supported by the support member, and a short rod portion; and a connecting rod having both end portions respectively pivotally supported by the short rod portions of the driven arm and the drive arm, and adapted for transmitting a drive force of the drive means.

In the lifting apparatus for a vehicle thus constructed, in the case where the working (operating) rod of the drive means is in an expanded state, respective long rod portions of the drive arm and the driven arm are positioned above, and the platform is fitted into the cut portion of the floor.

On the contrary, when the working (operating) rod of the drive means is contracted, the drive arm and the driven arm rotate with their elbow portions being as a fulcrum respectively through rotational links and the drive shaft. In this case, the platform lowers while depicting an arcuate locus (trace) and is eventually located immediately below the initial position. It is to be noted that when the platform returns to the original position, an operation is carried out in a mode opposite to the above.

BRIEF DESCRIPTION OF THE DRAWINGS

Figure 1:
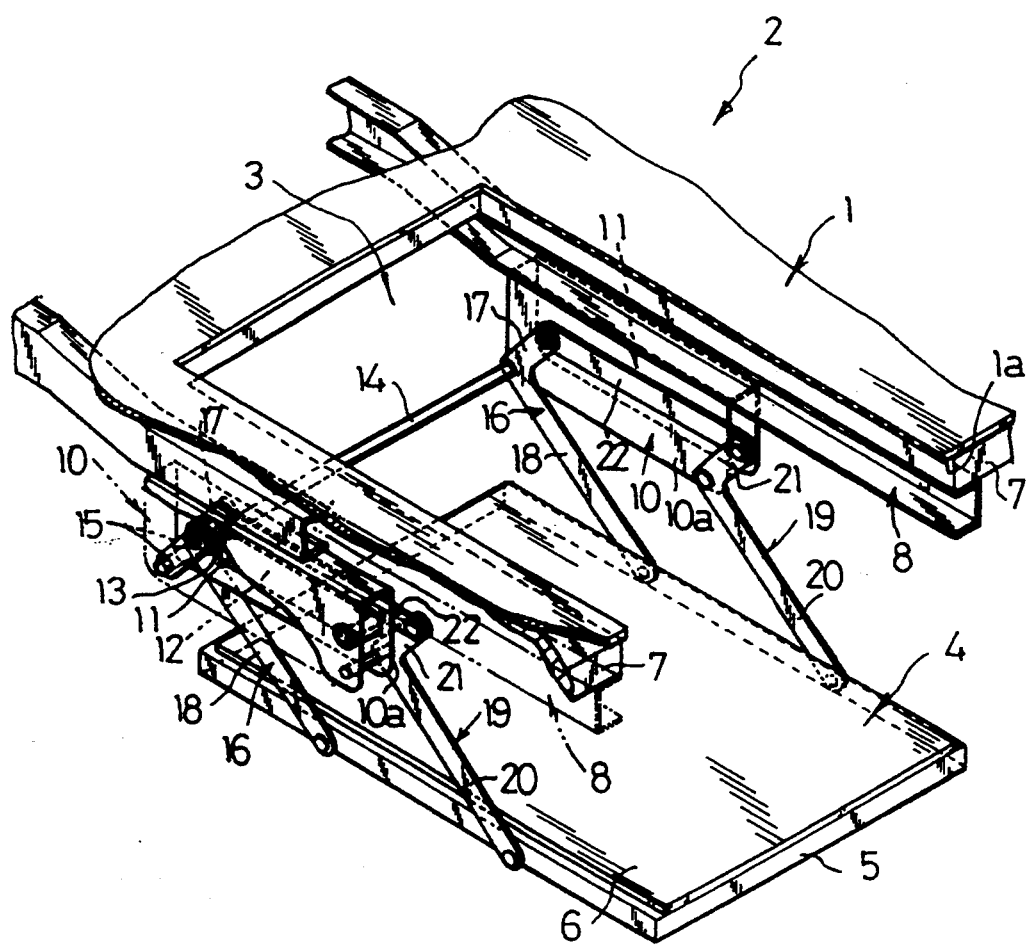
FIG. 1 is a perspective view showing an embodiment of this invention.

This invention will now be described in detail in accordance with the preferred embodiment shown.

In the embodiment shown in FIGS. 1 to 5, reference numeral 1 denotes a floor of a vehicle 2 such as a vehicle of the wagon type or a microbus, etc. At the back portion of the floor 1, a parallel channel-shaped cut portion 3 is formed. This cut portion 3 is formed so as to have required dimensions to permit, e.g. , a person utilizing a wheelchair to be taken into the vehicle as it is.

Reference numeral 4 denotes a rectangular platform adapted to be fitted into the cut portion 3. In this embodiment, this platform 4 comprises an upwardly and downwardly movable plate ( hereinafter simply referred to as a lifting plate) 5 of which edge portion is in surface-contact with a lower surface 1a of the peripheral portion of the floor in which the cut portion 3 is formed, and a fitting plate 6, which is formed so that it is slightly smaller than the lifting plate 5, is fixedly attached on the upper surface of the lifting plate 5 in an overlapping manner, and is loosely fitted into the cut portion 3.

Reference numeral 7 denotes first attachment members fixedly attached directly on the lower surface of the floor 1. These attachment members 7 are slightly away from the both side portions of the cut portion 3. Each first attachment member 7 has a role as a spacer with respect to the floor and a reinforcing member of the floor 1.

Reference numeral 8 denotes second attachment members of light-weight channel steel fixedly provided on the lower surfaces of the floor 1 and the attachment members 7. Respective second attachment members 8 are bent stair-step shaped in the middle thereof, and are provided in parallel with a required spacing therebetween. Since members which will be described later including such second attachment members 8 are constituted by corresponding pairs of left and right members, the same reference numerals are respectively attached thereto for convenience, and only ones of respective pairs will now be described.

Reference numeral 10 denotes a support member fixedly provided on the lower surface of the second attachment member 8. In this embodiment, this support member 10 is formed as a frame body in the form of an elongated box or of light-weight channel steel having an opening. This support member 10 is attached in the same direction as that of the second attachment member 8 extending to the entrance/exit at the back of the vehicle.

Reference numeral 11 denotes drive means fitted in the support member 10. In this embodiment, this drive means 11 comprises a hydraulic cylinder 12 of which back end portion is pivotally attached on the support member 10, and a plurality of rotational links 15 having an upper end portion pivotally supported to the front end portion of a working (operating) rod 13 projected from the hydraulic cylinder 12, and a lower end portion fixed on a drive shaft 14.

The drive shaft 14 is laterally and axially provided at the front side of left and right support members 10, 10 so that it is perpendicular to the support members 10 and the second attachment members 8. The pivotally attached portion with respect to the support member 10 of the drive shaft 14 is positioned below the pivotally attached portion with respect to the support member 10 of the hydraulic cylinder 12.

Figure 2:
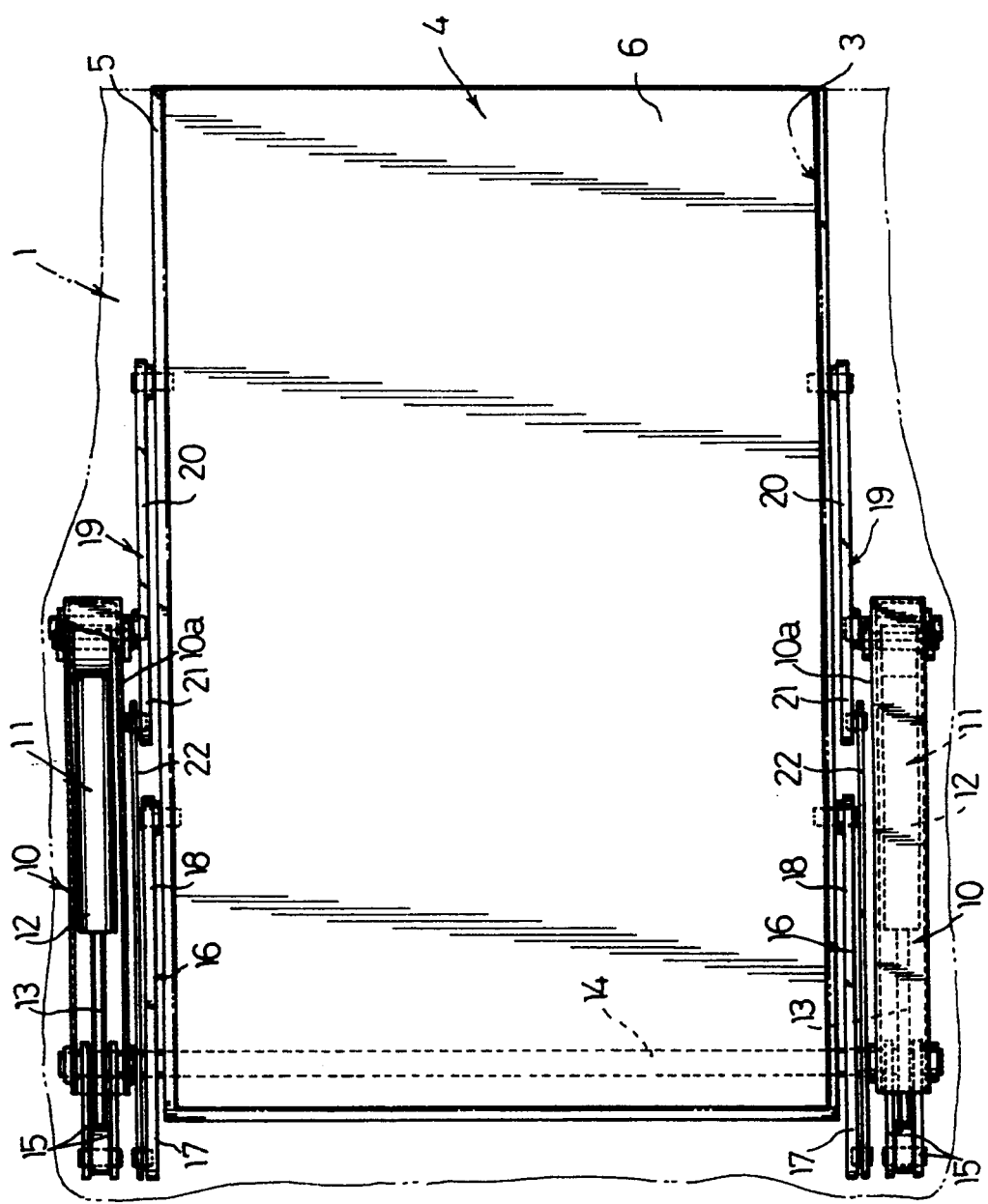
FIG. 2 is an explanatory view when viewed from the plane side of this invention.
Figure 3:
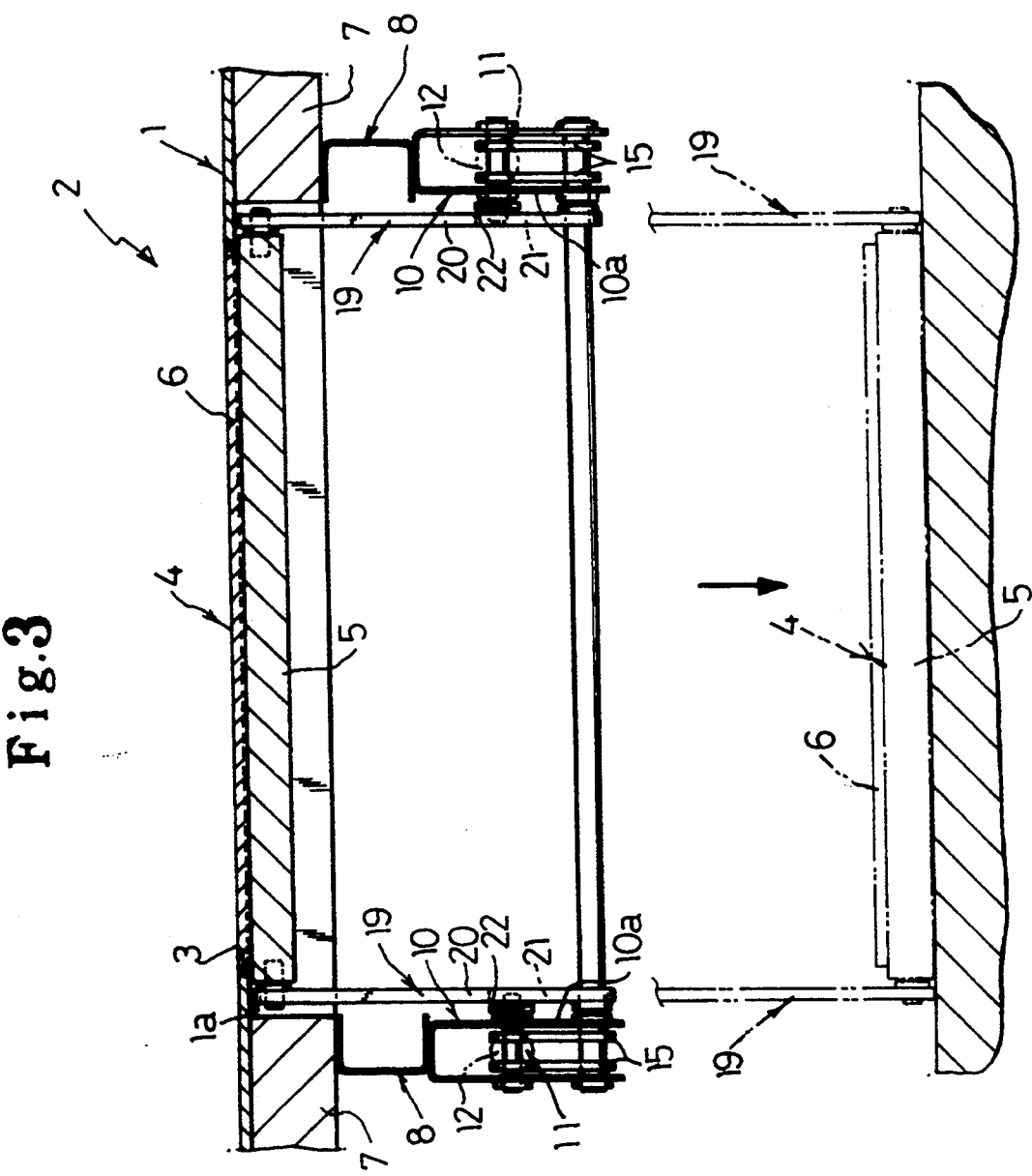
FIG. 3 is an explanatory view when viewed from the back side of a vehicle of this invention.

Reference numeral 16 denotes an L-shaped drive arm having an elbow portion fixed to the portion closer to the end portion of the drive shaft 14, a short rod portion 17 in an angular direction, and a long rod portion 18 pivotally supported on the side surface closer to the back end portion of the platform 4. This drive arm 16 is positioned outwardly of an inside wall 10a of the support member 10 as shown in FIG. 2. Namely, this drive arm 16 is provided between the support member 10 and the platform 4.

On the other hand, reference numeral 19 denotes an L-shaped driven arm provided oppositely to the driven arm 16, and having a long rod portion 20 similarly pivotally supported on the side surface closer to the front end portion of the platform 4, an elbow portion pivotally supported on the support member 10, and a short rod portion 21.

Reference numeral 22 denotes a bar-shaped connecting rod having both end portions pivotally supported to the respective short rod portions 21, 17 of the driven arm 19 and the drive arm 16, and adapted to transmit a drive force of the drive means 11.

Accordingly, when attention is drawn to the respective pivotal points in the combinational relationships of the connecting rod 22, the drive arm 16, the driven arm 19 and the platform 4, the connecting points of the elbow portions, and the pivotal points of the elbow portions, it seems that two parallelograms in total of a small parallelogram at the upper part and a large parallelogram at the lower part are formed with the respective elbow portions being as a boundary.

Figure 4:
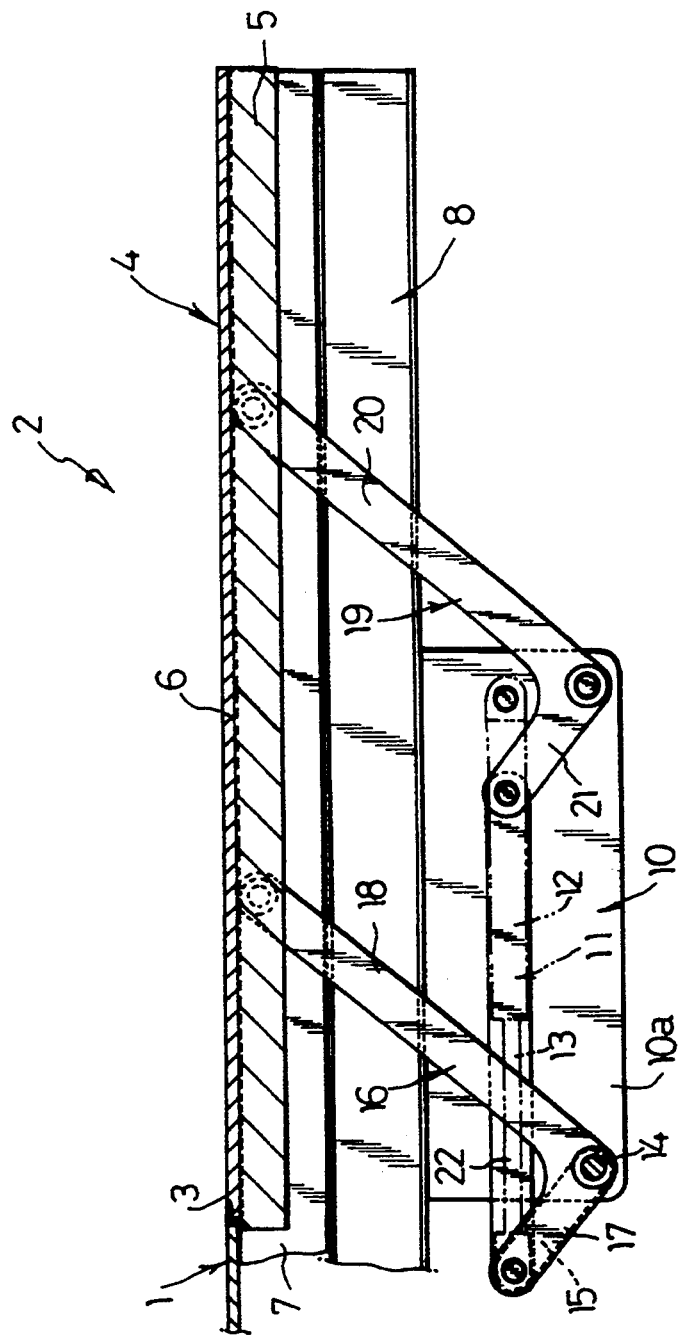
FIG. 4 is an explanatory view of an initial state of this invention.

In the above-mentioned configuration, FIG. 4 shows an initial state. In this case, the working (operating) rod 13 of the drive means 11 is in an expanded state. Further, respective long rod portions 18, 20 of the drive arm 16 and the driven arm 19 are positioned above, and the platform 4 is fitted into the cut portion 3 of the floor 1.

Figure 5:
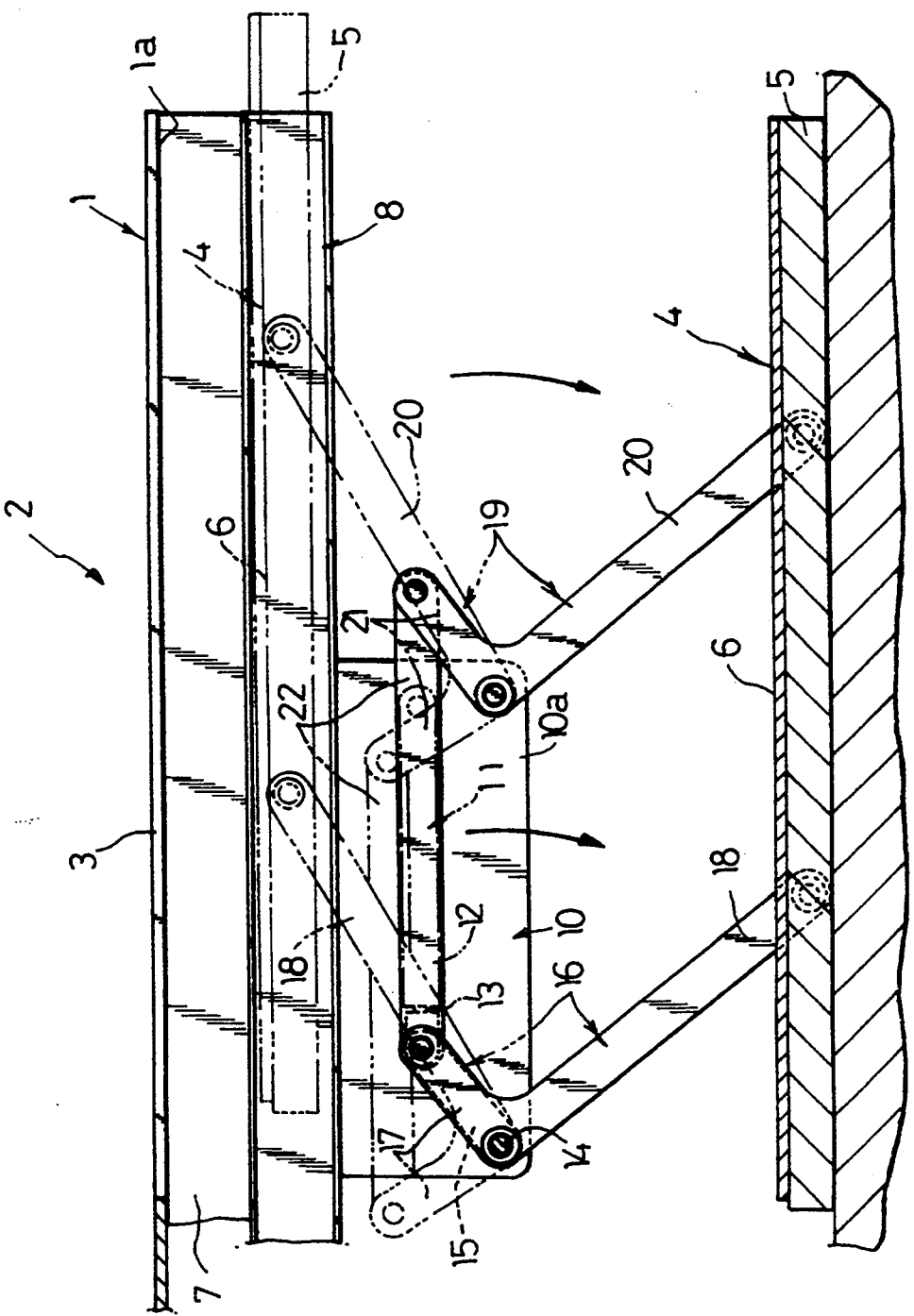
FIG. 5 is an explanatory view of an operating state of this invention.

When the working (operating) rod 13 of the drive means 11 is contracted, the drive arm 16 and the driven arm 19 rotate in a clockwise direction as shown in FIG. 5 with the respective elbow portions being as a fulcrum respectively through the rotational links 15 and the drive shaft 14 integral with the rotational links. In this case, the platform 4 lowers in such a manner that it is temporarily projected slightly to the front end portion side while depicting an arcuate locus (trace), and is eventually located immediately below the initial position while maintaining the horizontal state at all times. This state is shown in FIG. 5. In this case, respective long rod portions 18, 20 of the drive arm 16 and the driven arm 19 are positioned below.

On the other hand, when the working (operating) rod 13 of the drive means 11 is expanded, the drive arm 16 and the driven arm 19 rotate in a counterclockwise direction with the respective elbow portions being as a fulcrum respectively through the rotational links 15 and the drive shaft 14, and are returned to the original position. In this case, the fitting plate 6 of the platform 4 is fitted into the cut portion 3 of the floor 1. Thus, the lifting plate 5 comes into contact with the lower surface 1a of the floor 1, and is stopped.

It is to be noted that while, in the abovementioned embodiment, the drive shaft 14 is laterally and axially provided on the left and right support members 10, 10 so that it rotates in accordance with the expanding and contracting movement of the working (operating) rod 13 of the drive means 11, it is not necessarily required that the drive shaft is laterally and axially provided. For example, such shafts may be individually provided on the left and right sides, respectively.

As is clear from the foregoing description, effects as recited below are provided in this invention.

(1) Since respective members constituting the apparatus are not provided in a space within a vehicle, space can be effectively utilized with respect to a human being or a load (cargo).

(2) Since the platform is caused to lower immediately below with respect to an initial position of the floor, there is no necessity of providing a required space at the back of a vehicle in taking a human being or a load (cargo), etc. onto the floor of the vehicle.

(3) Since a cut portion of a required dimension is formed at the floor of a vehicle and the platform is caused to be fitted into the cut portion, the platform is permitted to be of a simple structure.

(4) In the case of the embodiment where the drive shaft is laterally and axially provided on the left and right support members so that it rotates in accordance with the expanding and contracting movement of the working (operating) rod of the drive means, the platform moves upwardly and downwardly in a horizontal state at all times without being inclined in left and right directions.

What is claimed is:

1. A lifting apparatus for a vehicle, which comprises a platform adapted to be fitted into a cut-out portion formed in a backward portion of a floor of a vehicle; oppositely disposed drive means provided at support members attached to a lower part of the floor on an outside of said platform; a drive shaft axially supported by the support members so that the drive shaft rotates by expanding or contracting movement of a working rod of the oppositely disposed drive means; an L-shaped drive arm having an elbow portion fixed to the drive shaft, a short rod portion, and a long rod portion pivotally supported by the platform; an L-shaped driven arm provided oppositely to the drive arm and having a long rod portion similarly pivotally supported by the platform, an elbow portion pivotally supported by the support members, and a short rod portion; and a connecting rod having opposite end portions respectively pivotally supported by the short rod portions of the L-shaped driven arm and the L-shaped drive arm, and adapted for transmitting a drive force of the drive means.

2. A lifting apparatus for a vehicle as set forth in claim 1, wherein said drive means is provided in said support members.

3. A lifting apparatus for a vehicle as set forth in claim 1, wherein said support members are a frame body in the form of an elongated box having an opening portion, and are indirectly fixed through an attachment member at the lower part of the floor of the vehicle.

4. A lifting apparatus for a vehicle as set forth in claim 1, wherein said drive shaft is laterally and axially supported by left and right support members.

5. A lifting apparatus for a vehicle, which comprises a platform adapted to be fitted into a cut-out portion formed at a backward portion of a floor of a vehicle; drive means provided at support members attached to a lower part of the floor; a drive shaft axially supported by the support members so that the drive shaft rotates by expanding or contracting movement of a working rod of the drive means; an L-shaped drive arm having an elbow portion fixed to the drive shaft, a short rod portion, and a long rod portion pivotally supported by the platform; an L-shaped driven arm provided oppositely to the drive arm and having a long rod portion similarly pivotally supported by the platform, an elbow portion pivotally supported by the support members, and a short rod portion; and a connecting rod having opposite end portions respectively pivotally supported by the short rod portions of the L-shaped driven arm and the L-shaped drive arm, and adapted for transmitting a drive force of the drive means, said drive means comprises a cylinder pivotally attached on the support members, and a rotational link having an upper end portion pivotally supported on a front end portion of the working rod projected from the cylinder, and a lower end portion fixed on the drive shaft.

6. A lifting apparatus for a vehicle as set forth in claim 5, wherein said drive means is provided in said support members.

7. A lifting apparatus for a vehicle as set forth in claim 5, wherein said support members are a frame body in the form of an elongated box having an opening portion, and are indirectly fixed through an attachment member at the lower part of the floor of the vehicle.

8. A lifting apparatus for a vehicle as set forth in claim 5, wherein said drive shaft is laterally and axially supported by left and right support members.

* * * * *